United States Patent
Mendicino et al.

(10) Patent No.: US 7,802,230 B1
(45) Date of Patent: Sep. 21, 2010

(54) HETEROGENEOUS SOFTWARE INTEGRATION SYSTEMS AND METHODS

(75) Inventors: Vincent L. Mendicino, Burlingame, CA (US); Dirk V. Wodtke, Aptos, CA (US)

(73) Assignee: SAP AG, Walldorf (DE)

( * ) Notice: Subject to any disclaimer, the term of this patent is extended or adjusted under 35 U.S.C. 154(b) by 1103 days.

(21) Appl. No.: 11/229,907

(22) Filed: Sep. 19, 2005

(51) Int. Cl.
*G06F 9/44* (2006.01)

(52) U.S. Cl. .................. 717/113; 717/105; 717/162

(58) Field of Classification Search ......... 717/104–113, 717/162–167
See application file for complete search history.

(56) References Cited

U.S. PATENT DOCUMENTS

| | | | | |
|---|---|---|---|---|
| 6,023,271 A * | 2/2000 | Quaeler-Bock et al. | ..... | 715/866 |
| 6,564,368 B1 * | 5/2003 | Beckett et al. | ...... | 717/113 |
| 7,150,001 B1 * | 12/2006 | Pepin et al. | ........ | 717/107 |
| 7,240,328 B2 * | 7/2007 | Beckett et al. | ...... | 717/113 |
| 7,322,022 B2 * | 1/2008 | Al-Azzawe et al. | ...... | 717/106 |
| 7,676,787 B2 * | 3/2010 | Pepin | .............. | 717/105 |
| 2003/0023953 A1 * | 1/2003 | Lucassen et al. | ...... | 717/106 |
| 2004/0015833 A1 * | 1/2004 | Dellarocas et al. | ..... | 717/106 |
| 2004/0015858 A1 * | 1/2004 | Seto et al. | ........ | 717/120 |
| 2004/0187090 A1 * | 9/2004 | Meacham | ........ | 717/103 |
| 2005/0066304 A1 * | 3/2005 | Tattrie et al. | ...... | 717/101 |
| 2006/0095276 A1 * | 5/2006 | Axelrod et al. | ....... | 705/1 |
| 2006/0206567 A1 * | 9/2006 | Milligan et al. | ...... | 709/206 |
| 2006/0253830 A1 * | 11/2006 | Rajanala et al. | ...... | 717/105 |

* cited by examiner

*Primary Examiner*—Wei Y Zhen
*Assistant Examiner*—Ryan D Coyer
(74) *Attorney, Agent, or Firm*—Fountainhead Law Group PC

(57) ABSTRACT

Embodiments of the present invention improve integration of heterogeneous software components. In one embodiment the present invention includes a computer-implemented method comprising receiving metadata that defines an interface for communicating with a custom component, mapping at least one attribute between the custom component and at least one other program component of an application, and generating wrapper code based on the metadata and the mapping, wherein the wrapper code communicates information between the custom component and the application.

18 Claims, 19 Drawing Sheets

```xml
<?xml version="1.0" encoding="UTF-8" ?>
<control xmlns:xsi="http://www.w3.org/2001/XMLSchema-instance" xsi:noNamespaceSchemaLocation="../../../configuration/metadata.xsd">

<title>Advanced Worklist</title>
<start_filename>main.mxml</start_filename>
<ui_technology>Flex</ui_technology>

<property>
<id>visible_rows</id>
<title>Visible Rows</title>
<type>number</type>
<default_value>10</default_value>
</property>

<port>
<id>search_results</id>
<title>search_results</title>
<type>output_set</type>
<field>
<id>subject</id>
<type>string</type>
</field>
<field>
<id>due</id>
<type>string</type>
</field>
<field>
<id>priority</id>
<type>string</type>
</field>
<field>
<id>from</id>
<type>string</type>
</field>
<field>
<id>sent</id>
<type>string</type>
</field>
</port>
```

*Fig. 10B*

```
<port>
<id>create_task</id>
<title>create_task</title>
<type>input</type>
- <field>
<id>subject</id>
<type>string</type>
</field>
- <field>
<id>due</id>
<type>string</type>
</field>
- <field>
<id>priority</id>
<type>string</type>
</field>
</port>

- <port>
<id>search_tasks</id>
<title>search_tasks</title>
<type>input</type>
- <field>
<id>search_term</id>
<type>string</type>
</field>
</port>
</control>
```

*Fig. 10C*

```xml
<URCustom id="ACJIP" name="Advanced Worklist 1" dndCntrl="[object Object]" pos="305 120" box_style="2" box_features="TTL SCR" box_size="256 240" custom_meta=";control_type=9;control_ui_tech=Flex;" custom_attrs="?props??prop??id?visible_rows?/id??title?Visible Rows?/title??type?number?/type??default?10?/default??prop??/props?"
external_port_ids="AEAIQ=search_results;AEAIR=create_task;AEAIS=search_tasks;" box_pos="8 8"
custom_attrs_url="visible_rows=10?" size="140 60" dndMode="true" cc__9__visible_rows="10">

<GmlPort id="AEAIQ" name="search_results" role="OUTPUT" anchor="R15" spec="DT_SET_OUT" pos="140 15">
        <Field name="subject" appName="test" idx="0" type="0" show="Y" visible="true" add="R" kind="R"/>
        <Field name="due" appName="test" idx="0" type="0" show="Y" visible="true" add="R" kind="R"/>
        <Field name="priority" appName="test" idx="0" type="0" show="Y" visible="true" add="R" kind="R"/>
        <Field name="from" appName="test" idx="0" type="0" show="Y" visible="true" add="R" kind="R"/>
        <Field name="sent" appName="test" idx="0" type="0" show="Y" visible="true" add="R" kind="R"/>
    </GmlPort>

<GmlPort id="AEAIR" name="create_task" role="INPUT" anchor="L15" spec="DT_OBJ_IN" pos="0 15">
        <Field name="subject" appName="test" idx="1" type="10" show="Y" visible="true" add="R" kind="R"/>
        <Field name="due" appName="test" idx="1" type="10" show="Y" visible="true" add="R" kind="R"/>
        <Field name="priority" appName="test" idx="1" type="10" show="Y" visible="true" add="R" kind="R"/>
    </GmlPort>

<GmlPort id="AEAIS" name="search_term" role="INPUT" anchor="L^" spec="DT_OBJ_IN" pos="0 30">
        <Field name="search" appName="test" idx="2" type="10" show="Y" visible="true" add="R" kind="R"/>
    </GmlPort>

</URCustom>
```

*Fig. 10D*

```
<html>
<style>BODY {
margin:0px;
overflow:hidden}
</style>

<head>
<script language='javascript' charset='utf-8'>
window.sendHandler = function(name, value) {
        window.document.comp_9.SetVariable(name, value);
}
```
⎫ 1060
⎬ To Custom
⎭ Component

```
function comp_9_DoFSCommand(cmd, args) {
        var cmds = cmd.split(' ');

if(cmds[0]=='fire') {
                // frame event data
                window.parent.externalEventHandler(cc_frm_id, cmds[1], args);
        }
}
```
⎫
⎬ 1051
⎭

```
var cc_frm_id = '';
function getParams() {
        var paramsStr = window.location.search.substring(1);
        var params = paramsStr.split('&');

if(params.length>0) {
                var cc_frm_id_str = params[0].split('=');
                cc_frm_id = cc_frm_id_str[1];

var newParams = '';
                for(var i=1; i<params.length; i++) {
                        newParams += params[i] + '&';
                }
                paramsStr = newParams;
        } return(paramsStr);
}
</script>
<SCRIPT language="VBScript">
<!--
Sub comp_9_FSCommand(ByVal command, ByVal args)
  call comp_9_DoFSCommand(command, args)
end sub
-->
</SCRIPT>
```
⎫ 1050
⎬
⎭ From Custom Component

```
</head>
<body scroll='no'>
<table width='100%' height='100%' cellspacing='0' cellpadding='0'><tr><td valign='top'>

<script language='javascript' charset='utf-8'>
var sMainFilename='./src/comp_9_main.mxml.swf';
var sAppName='comp_9';
document.write("<object classid='clsid:D27CDB6E-AE6D-11cf-96B8-444553540000' codebase='http://
download.macromedia.com/pub/shockwave/cabs/flash/swflash.cab#version=7,0,14,0' width='100%' height='100%'
id='" + sAppName + "'>");
document.write(" <param name='flashvars' value='" + getParams() + "'>");
document.write(" <param name='src' value='" + sMainFilename + "'>");
document.write(" <embed pluginspage='http://www.macromedia.com/go/getflashplayer' width='100%'
height='100%'");
document.write("   flashvars='" + getParams() + "'");
document.write("   src='" + sMainFilename + "'");
document.write("   name='" + sAppName + "'");
document.write("   swLiveConnect='true'");
document.write(" />");
document.write("</object>");
</script>

</td></tr></table>
```

*Fig. 10E*

HETEROGENEOUS SOFTWARE INTEGRATION SYSTEMS AND METHODS

BACKGROUND

The present invention relates to integration of software, and in particular, to systems and methods for integrating heterogeneous software components.

The growth of computers and computer networks has resulted in a rapid increase in the number and types of available computer programs. Computer programs (i.e., software) perform a wide variety of functions and may be used in applications ranging from the management of large volumes of business data for large companies to providing a rich information environment for individual users over the Internet. With the wide availability of different programs offering different unique features and functions, programs are often designed to interface with other programs so that one or both programs can use the features of the other. Typically, a main program will be hand coded by a programmer, and the programmer will include procedure or function calls to another program to include some or all of the other programs functionality in the main program. However, this traditional technique of hand coding interfaces between programs is expensive and tedious, and typically requires the skills of a highly trained programming professional. Moreover, if the programs are implemented in different technologies, interfacing between the two programs can be a very complicated task. For example, communicating between different UI technologies (e.g. JavaScript, Java, .Net) is much more difficult that communicating between the same UI technology.

Recently, design programs have been created that provide for model driven application development. These programs are also referred to as "design tools." FIG. 1A is an example of a design tool 101 that may be used to develop software applications. Design tool 101 allows a user to graphically compose applications by dragging different components (e.g., User Interface (UI) elements) onto a drawing pane and connecting them with backend functionality. The composed application may be stored as metadata in a repository 102. When an application is ready to be deployed, design tool 101 may read the metadata and automatically generate the program code for the application. The application may then be deployed across an enterprise for access by target users. This model driven approach allows for a rapid and error free software development and does not typically require advanced programming skills.

FIG. 1B shows an existing design tool and deployment environment. A design tool 110 such as NetWeaver™ Visual Composer from SAP® provides a model driven approach for the graphical composition of applications. Composer 110 includes a set of visualization controls, ranging from buttons to animated pie charts that may be specified as part of an application. The resulting applications may be deployed on an enterprise portal 120 that allows access by clients 130 running web browsers, for example. Applications developed according to known techniques may be used to access and process information from a variety of data sources 140 using connectivity software 150 (sometimes referred to as "middleware") at runtime. Middleware layer 150 provides an integration platform and interface between applications and provides a runtime environment. Middleware layer 150 interoperates with applications created using design tool 110, which may include applications in .NET, J2EE, WebSphere, HTTP, XML, or Web services, for example. The design tool 110 compiler enables generation of application programs that can be deployed to the portal 120. Once deployed, the application programs created by design tool 110 can retrieve data from the portal 120 and connectivity framework 150 and display this information just like any other hand-coded portal pages.

FIG. 2 shows a graphical user interface of an existing design tool. Design tool 200 facilitates the creation of content for the Enterprise Portal 120 using a visual user interface rather than manually writing code. Design tool 200 provides sophisticated, yet simple-to-use tools for creating application programs (sometimes referred to as portlets or iViews) that communicate with other applications to move information from one program to another, combine data, and/or display data (e.g., to a page). An example design tool 200 may operate on top of the Enterprise Portal, utilizing the portal's connector-framework interfaces to allow users to access a range of internal and external databases or other data services.

Applications can be created using an easy drag-drop-connect paradigm. Users may select from a variety of components for specifying data sources (e.g., "Data Services"), operations, formulas, models, connectors, and views for defining an application. For example, as shown in FIG. 2, a user may specify a source 201 that outputs the top N sales by selecting and configuring a visual object representing a desired source. An output port on the source may be connected to an input port on a selected and configured view of the data 202. View 202 may display the data in a pie chart format, for example. The models are then compiled into executable code and deployed.

One problem with existing design tools, such as the one in the above example, is that the components available to a user in the design tool's palette are fixed. Typically, the only components available to a user of the design tool are components that have been specifically designed to work with the particular design tool (i.e., components created by the design tool provider). However, many users may find that the content of a design tool's control palette is too limited for the desired application. For example, application requirements may mandate specific functionality or data visualizations to better and more intuitively present information to the end-user. Customers requiring enhanced functionality generally must submit a development request to the design tool provider.

Accordingly, it would be advantageous if users of the design tool could integrate independently created components (i.e. custom components) into their applications. Unfortunately, custom components cannot communicate with the design tool because they do not share a common interface. Thus, it is not currently possible to incorporate custom components into the design tools palette of available components. Moreover, because third party components are programmed, in any of a variety of programming languages, interfacing these components with applications requires hand coding, which is time consuming and expensive.

Therefore, existing technology is limited since it only allows for composing applications where all components use the same technology. For example, it is not currently possible to compose application screens that consist of third-party developed custom components which are built with different technologies. The present invention solves these and other problems by providing systems and methods for integrating heterogeneous software components.

SUMMARY

Embodiments of the present invention improve integration of heterogeneous software components. In one embodiment the present invention includes a computer-implemented method comprising receiving metadata that defines an interface for communicating with a custom component, mapping information between the custom component and at least one other program component of an application, and generating wrapper code based on the metadata and the mapping, wherein the wrapper code communicates information between the custom component and the application.

In one embodiment, the custom component is a custom display component. In another embodiment, the information mapped between the custom component and program includes at least one attribute. In another embodiment, the metadata is stored in a computer file having a predefined schema, such as XML, for example. The metadata may be used to specify a technology for the custom component, one or more ports for the custom component, or one or more properties for the custom component.

In another embodiment, the metadata specifies a technology for the custom component, one or more ports for the custom component, or one or more properties for the custom component.

In another embodiment, the method further comprises displaying a first visual object corresponding to the custom component in a graphical user interface, wherein the first visual object includes at least one of an input port or output port.

In another embodiment, the custom component is in a first programming language and the application is in a second programming language.

In another embodiment, the wrapper comprises a first component for communicating with the custom component and a second component for communicating with the application.

In another embodiment, the wrapper converts commands between technologies such as HTML, Java, .NET, Flash, or ActiveX, for example.

In another embodiment, the present invention includes a computer-readable medium containing instructions for controlling a computer system comprising code for receiving metadata that defines an interface for communicating with a custom component, code for displaying a visual object corresponding to the custom component in a graphical user interface, code for mapping the visual object corresponding to the custom component to at least one other visual object to define an application, and code for generating the application and a wrapper based on the metadata and the mapping, wherein the wrapper communicates information between the custom component and the application.

In another embodiment, the custom component is a custom display component.

In another embodiment, the metadata is stored in a computer file having a predefined schema.

In another embodiment, the first visual object includes at least one of an input port or output port.

In another embodiment, a port includes a one or more of attributes, and a user specifies attributes transferred between visual object ports in the mapping.

In another embodiment, the mapping is stored as metadata in a repository, and the design tool generates the application and the wrapper using the mapping metadata and metadata that defines the custom component.

In another embodiment, the wrapper comprises a first component for communicating with the custom component and a second component for communicating with the application.

In another embodiment, the present invention includes a computer system comprising an application server coupled to one or more client computers over a network, a custom component, a metadata file having a predefined schema, wherein the metadata file includes information for communicating with the custom component, and a design tool, wherein the design tool generates wrapper code based on the metadata file for communicating information between the custom component and the application, wherein the custom component is stored on a server, and an application communicates with the custom component through the wrapper.

In another embodiment, the application and wrapper are stored on the server.

In another embodiment, the application and at least a part of the wrapper is stored on a client computer.

In another embodiment, the application accesses resources in at least one database system, an ERP system, a CRM system, a SCM system, or any other application.

In another embodiment, the custom component is a custom display component.

The following detailed description and accompanying drawings provide a better understanding of the nature and advantages of the present invention.

BRIEF DESCRIPTION OF THE DRAWINGS

FIGS. 10A-E show an example of an integrated custom component according to one embodiment of the present invention.

DETAILED DESCRIPTION

Described herein are techniques for improving integration of software. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1A:
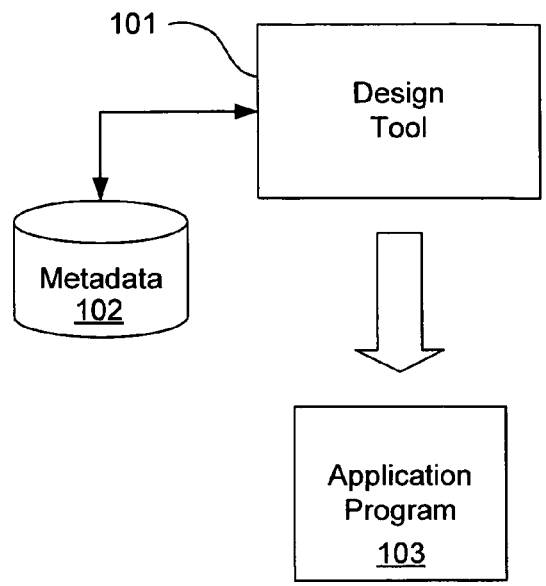
FIG. 1A is an example of a design tool that may be used to develop software applications.
Figure 1B:
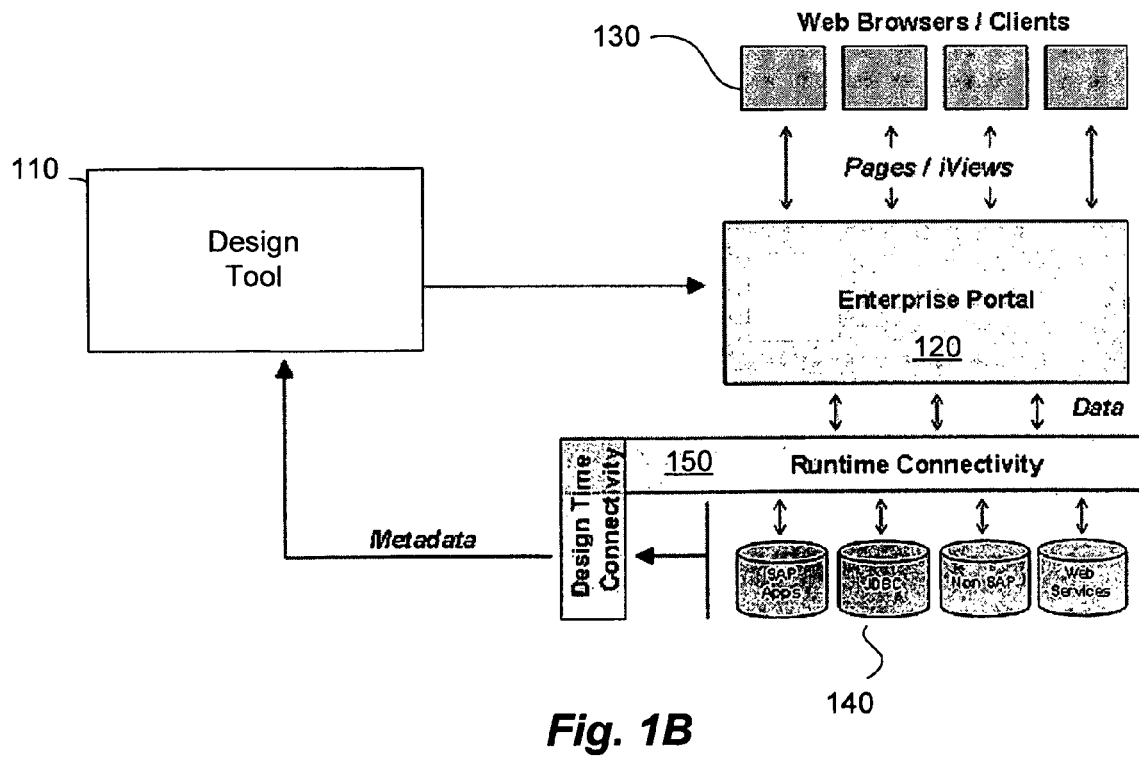
FIG. 1B shows an existing design tool and deployment environment.
Figure 2:
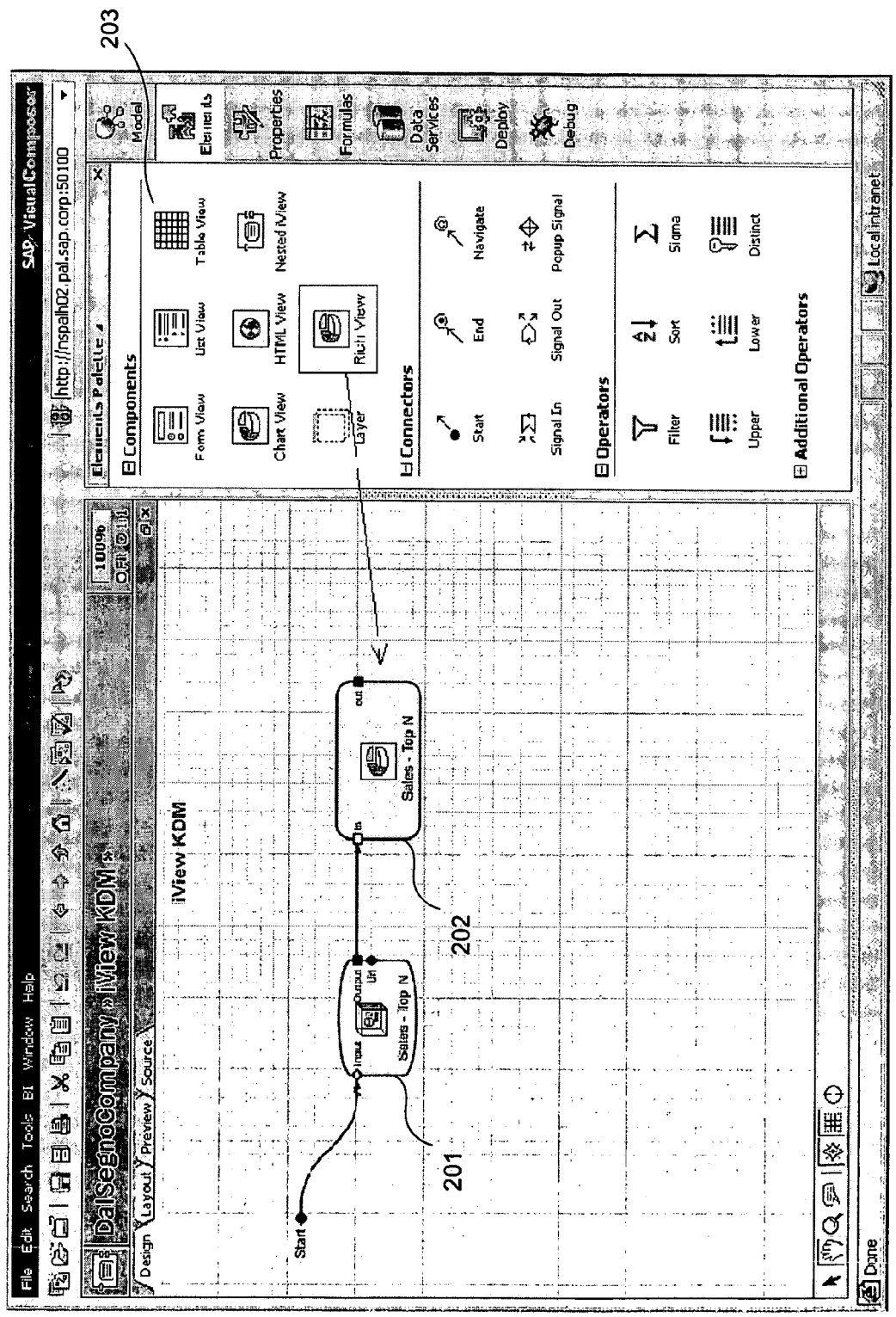
FIG. 2 shows a graphical user interface of an existing design tool.
Figure 3A:
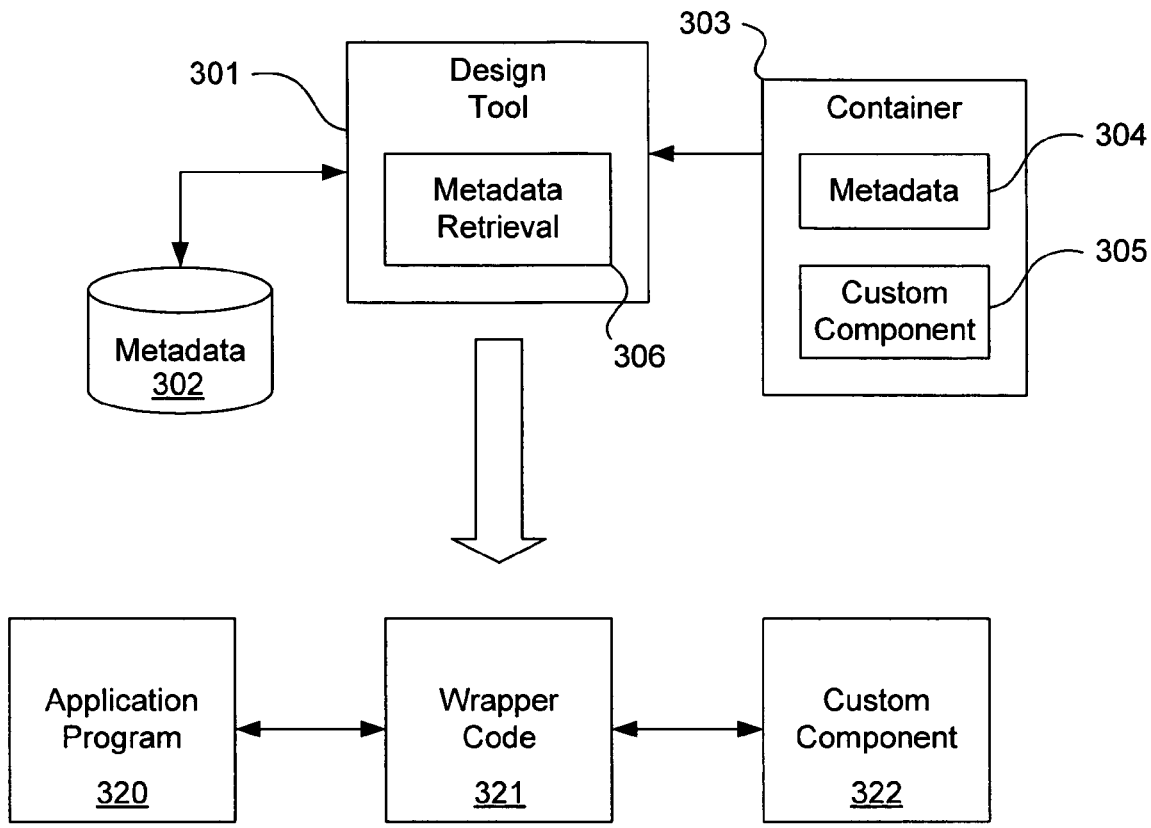
FIG. 3A illustrates integration of a custom component according to one embodiment of the present invention.

FIG. 3A illustrates integration of a custom component according to one embodiment of the present invention. Generally, the term component means a portion (or part) of a software program or system. An example of a component may be one or more blocks of code (or even a single line of code in some cases) for performing a particular function. A custom component is an external component that has been designed independently of, and in a different technology than, the programming application (herein, "application") into which it is being integrated, and performs one or more particular operations that may be useful to the programming application. A custom component 305 is provided together with metadata 304 to a design tool 301. Metadata is data about data, and may be used for a variety of purposes. In this case, the metadata 304 defines an interface for communicating with a custom component so that the custom component can be incorporated into design tool 301. For example, a custom component 305 and metadata 304 corresponding to the custom component 305 may be stored in a container 303 (e.g., a "zip file"). Design tool 301 may include a metadata retrieval component 308 for retrieving metadata 304 and storing it in metadata repository 302. A user may invoke design tool 301 for creating an application. Design tool 301 may be used to specify a variety of features and functions of an application, such as data sources, operations, formulas, models, connectors, or views, for example. Embodiments of the present invention allow a user to incorporate one or more custom components 305 into the design tool and resulting application. Design tool 301 may store the specification for the application (i.e., an application definition) as metadata in repository 302. When a user is ready to deploy the application, the metadata defining the application is used to generate executable code for the application 320. If a custom component 305 is included as part of the application, then the custom component's metadata 304 may be accessed by design tool 301 to generate wrapper code 321 for communicating information (e.g., data or commands) between the custom component and the application. A wrapper is a software component that acts as an interface between a custom component and an application. As shown in FIG. 3A, the output of design tool 301 includes an application program 320 and wrapper code 321. Application program 320 may communicate with custom component 322 through the automatically generated wrapper code 321.

Figure 3B:
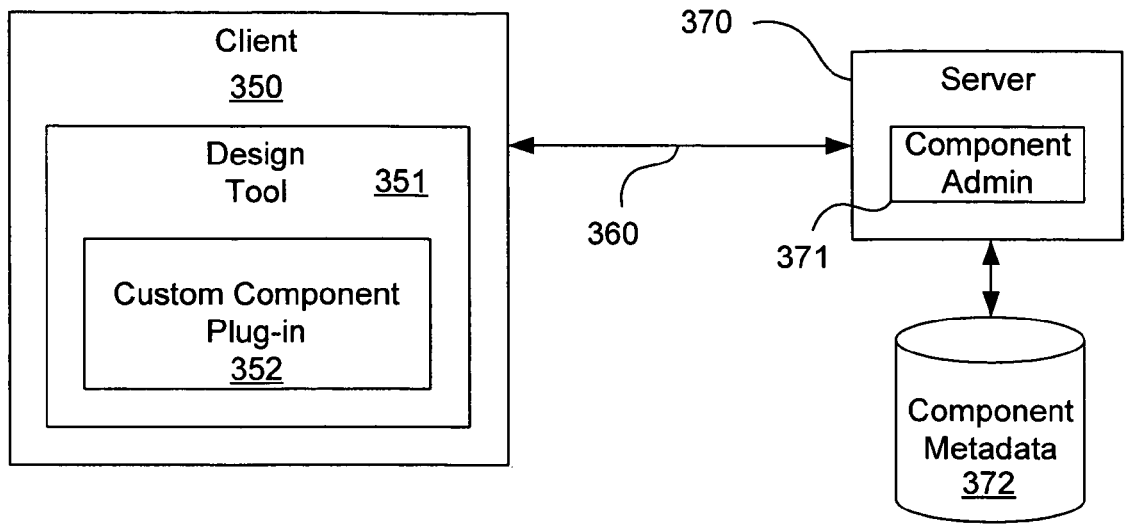
FIG. 3B illustrates a client-server design time environment according to one embodiment of the present invention.

FIG. 3B illustrates a client-server design time environment according to one embodiment of the present invention. A client computer system 350 may include design tool 351 for allowing users to design software applications. Design tool 351 includes a custom component plug-in 352 that allows a user to integrate custom components into the designs. In this example, the container for the custom component metadata 372 is stored remotely on a server 370 (e.g., in a repository). A user may incorporate the custom component into the design tool by accessing a custom component administrator program 371 across network 360. The administrator 371 may store access information for each available custom component, including path names for all relevant files and the type of container, if any, that the custom component and metadata are stored in. A user may simply select the desire custom components to incorporate into design tool 351, and the information about the selected custom component may be retrieved by the design tool. Custom component plug-in 352 may include a variety of features to support integration of custom components, including code for retrieving the custom components metadata, translating the metadata into a format used by the design tool, and generating the wrapper code used to communicate information between the custom component and the application.

Figure 3C:
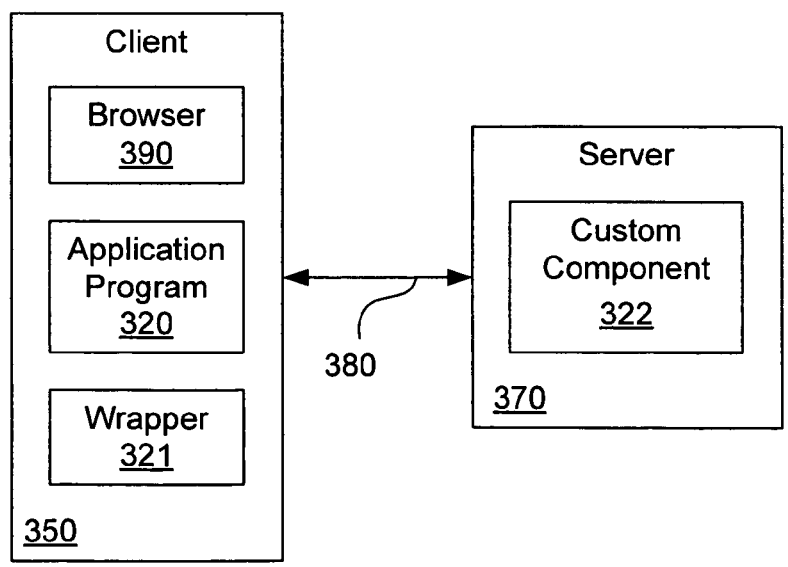
FIG. 3C illustrates a client-server run time environment according to one embodiment of the present invention.

FIG. 3C illustrates a client-server run time environment according to one embodiment of the present invention. After an application has been created using a design tool as described above, the design tool automatically generates the code for the application. If a custom component is incorporated into the design, the design tool also uses the custom control metadata and other information about the application (e.g., information about the mapping described below) to generate wrapper code that integrates the custom component with the application. As shown in FIG. 3C, an application 320, custom component 322, and wrapper 321 are deployed across a computer system including a client computer 350 coupled to a server computer 370 over a network 380. It is to be understood that a variety of deployment techniques could be used. In this example, the application 320 and wrapper 321 are deployed on client 350, and custom component 322 is deployed on server 370. In this example, a browser 390 may be invoked on client 350, and application 320 may be executed by the browser. If functionality of the custom component is invoked at runtime by the application, the application may interface with the custom component 322 using wrapper 321. For example, wrapper 321 may be used to pass data between application 320 and custom component 322, or invoke procedures or functions of the custom component. Wrapper 321 may also translate instructions between technologies. As described in more detail below, part of the communication function performed by wrapper 321 includes converting commands between technologies such as HTML, Java, .NET, Flash, or ActiveX, for example. While embodiments of the present invention include components that work with a browser, it is to be understood that the invention is not limited to browser based technologies.

Figure 4:
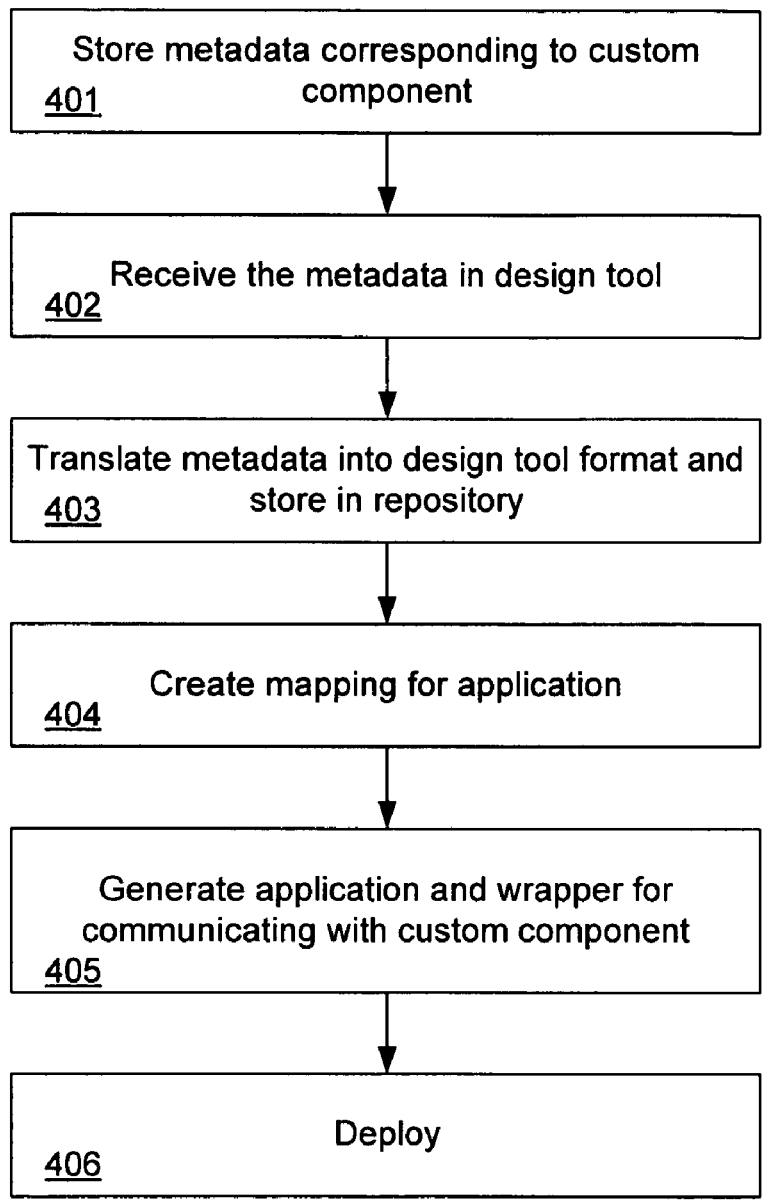
FIG. 4 illustrates method according to one embodiment of the present invention.

FIG. 4 illustrates method according to one embodiment of the present invention. At 401, metadata corresponding to a custom component is stored on a computer system. At 402, a design tool receives the metadata. For example, as mentioned above a user may retrieve the metadata into the design tool to incorporate a custom component into a design. At 403, the metadata may be translated into a native format used by the design tool and stored in a repository. Since design tools typically represent designs using metadata, the design tool will typically have a native format for such representations. To more efficiently incorporate a custom component into the design tool, it may be advantageous to receive the metadata corresponding to the custom component, and store the metadata in the native format. At 404, a mapping for the application is created. A mapping is a specification of the components used in an application and the relationship between such components. In one embodiment illustrated in more detail below, a mapping includes visual objects corresponding to software components coupled together in a graphical user interface. Each component in the mapping may have input and/or output ports for communicating information (e.g., attributes) between the components. Some embodiments of the present invention include mappings having a variety of components, including components that are native to the design tool environment and custom components that have been incorporated into the design tool environment. At 405, the design tool generates the code for the application and wrapper. At 406, the application, wrapper, and custom component may be deployed for execution on one or more computer systems.

Figure 5:
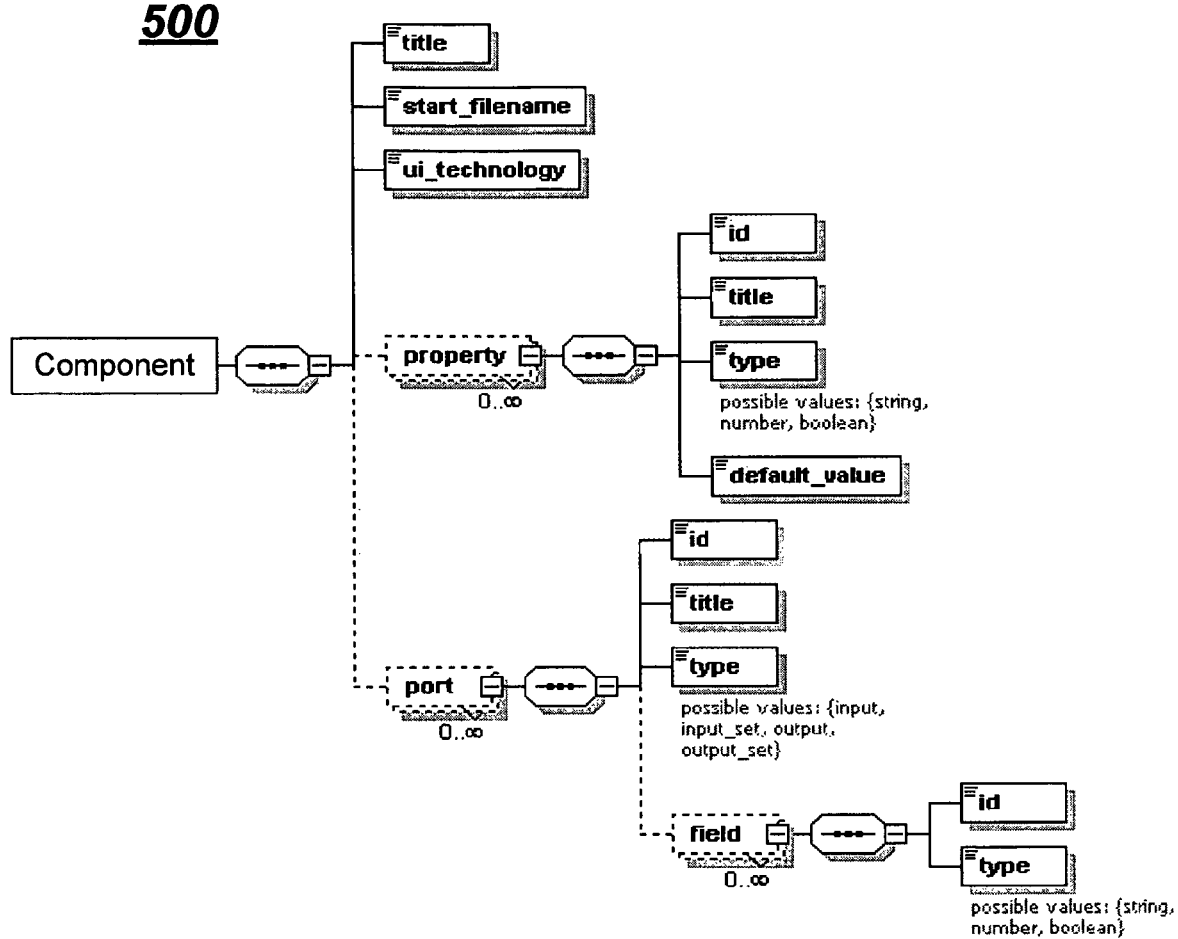
FIG. 5 illustrates a metadata schema according to one embodiment of the present invention.

FIG. 5 illustrates a metadata schema according to one embodiment of the present invention. The metadata defines an interface to the custom component, and may describe which data a particular custom component both expects at run time and which data it produces at run time, for example. The interface is defined either by the custom component developer or by a design tool administrator for each custom component. In this example, the metadata corresponding to the custom component may be formatted according to a particular predefined structure (i.e., a schema) so that the design tool may more readily access the metadata. For instance, if different custom components include particular information required by the design tool, and if that information is stored in a predefined structure understood by the design tool, then the design tool can efficiently access different metadata files for different custom components. The metadata may include information needed by the design tool to incorporate the custom component into the design tool's environment and information for generating code for the wrapper. Example metadata schema 500 illustrates the structure and information that may be used. The metadata may include tags for specifying the title, the custom component's starting filename as well as the technology that the custom component was developed in (e.g., Flash, .NET, Java). The title may be used to identify the custom component to the user of the design tool. The state filename may be included to specify the name of the file within the custom component's container that will start (render) the custom component when pointed to via a web browser, for example. For each component technology, the communication between the design tool application and the custom component may be different. Specifying the technology tag indicates which communication wrappers should be generated (e.g., Flash or Dynamic HTML).

The property tag and its child tags allow the design tool user, at design-time, to specify static parameters. The property tag may be repeated if multiple properties of the custom component are used. Table 1 shows an example of children of the property tag.

TABLE 1

| Tag | Description | Example |
| --- | --- | --- |
| id | This tag specifies what id will be used for referencing the property by the custom control. In some cases this data may be passed via a query string, in this case the name in the query string is the id specified here. | initial_location |
| title | The title identifies the property to the design tool user. | Initial Location |
| type | Specifies a restriction on the parameter's value type, possible values are "string", "number" and "Boolean." | String |
| default value | This is the default value displayed to the user in design tool. | California |

The port tag may be used to declare the data flow for the custom component. Data the custom component consumes is declared as an input port, and data the custom component produces is declared as output port. A port is a software construct for specifying data inputs and outputs. Each port may include a set of fields which will contain the data when transferred between the application and the custom component. Table 2 shows an example of children of the port tag.

TABLE 2

| Tag | Description | Example |
| --- | --- | --- |
| id | This tag specifies what id will be used for referencing the port by the custom component. | input_data |
| title | The title identifies the port to the design tool user. | Heat Map Input |
| type | The type specifies whether the port is for input into the custom component or output from the custom component. This tag may also specify the cardinality of the data passed between the custom component and the application, the data can be in the form of a table as a set of data, or as a one-to-one mapping between the field and value. | input_set |
| field | Each port, despite its type, can have 0 or more fields. Each field can be thought of as a column in table or a single field in a form. | |
| field.id | The id of the field may be referenced by the custom component and be displayed in the port properties when selected by the design tool user. | regional_average |

In one embodiment, the metadata may be stored in an XML file. Accordingly, the interface is declared using an XML file (e.g., metadata.xml), and the XML format is defined by an XML Schema Definition (XSD) file.

FIGS. 6A-D illustrate how a custom component may be integrated in a design tool according to one embodiment of the present invention. The design tool may display available components and connectors to a user in a tool palette, and a user may drag items from the tool palette to a design pane 610 (also referred to as a "storyboard"). In this example, a native component for sourcing data 602 ("get Prices") produces a sequence of prices on an output port "Values." The output port of source 602 is coupled to the input port of another native component 603 for displaying the data in a table. However, if a user desires to include custom components in an application to perform functions not supported by existing native facilities, a user may incorporate a custom component 601 into the design environment.

Figure 6A:
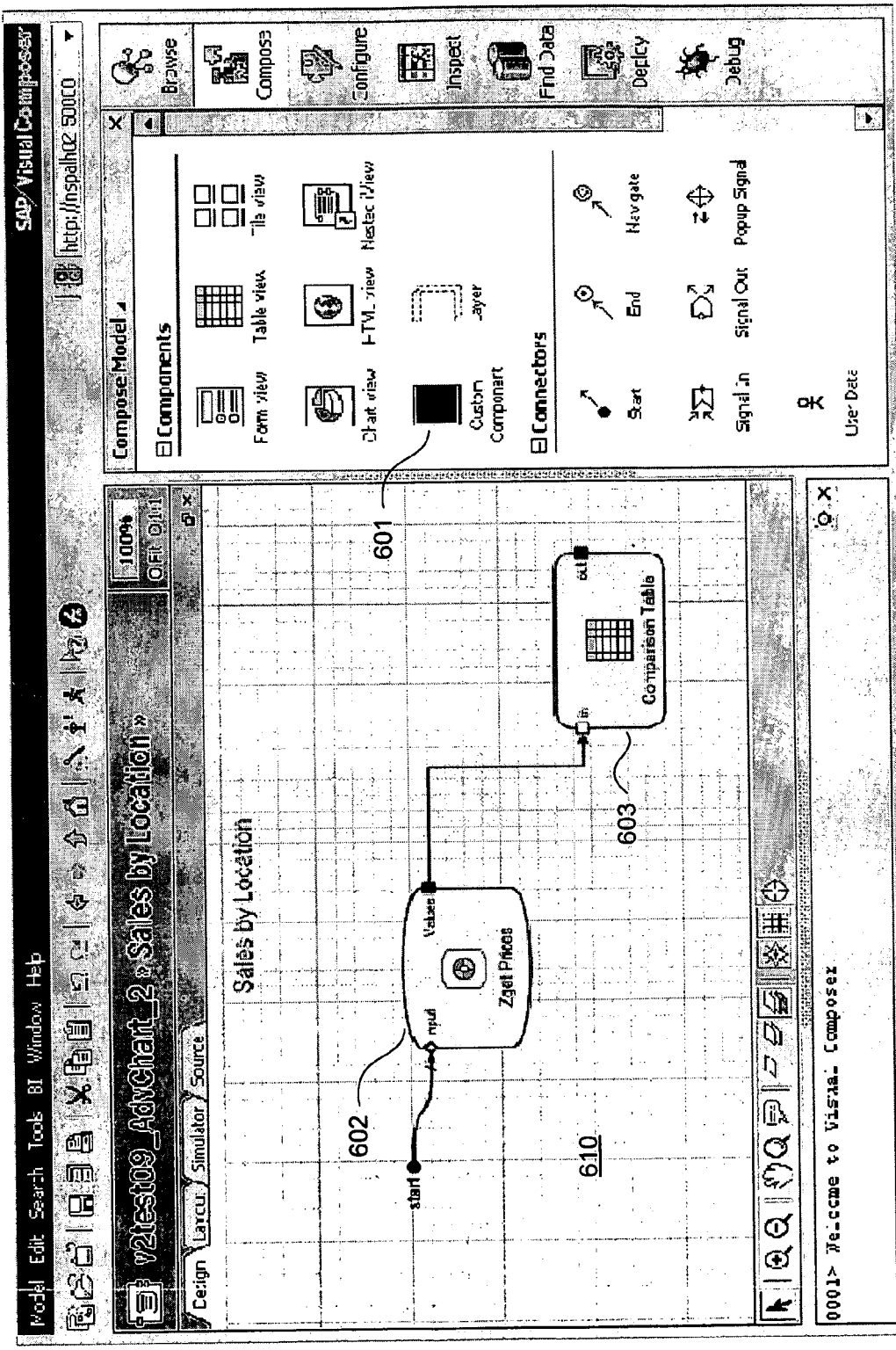
FIGS. 6A-D illustrate how a custom component may be integrated in a design tool and how an application is presented to users according to one embodiment of the present invention.
Figure 6B:
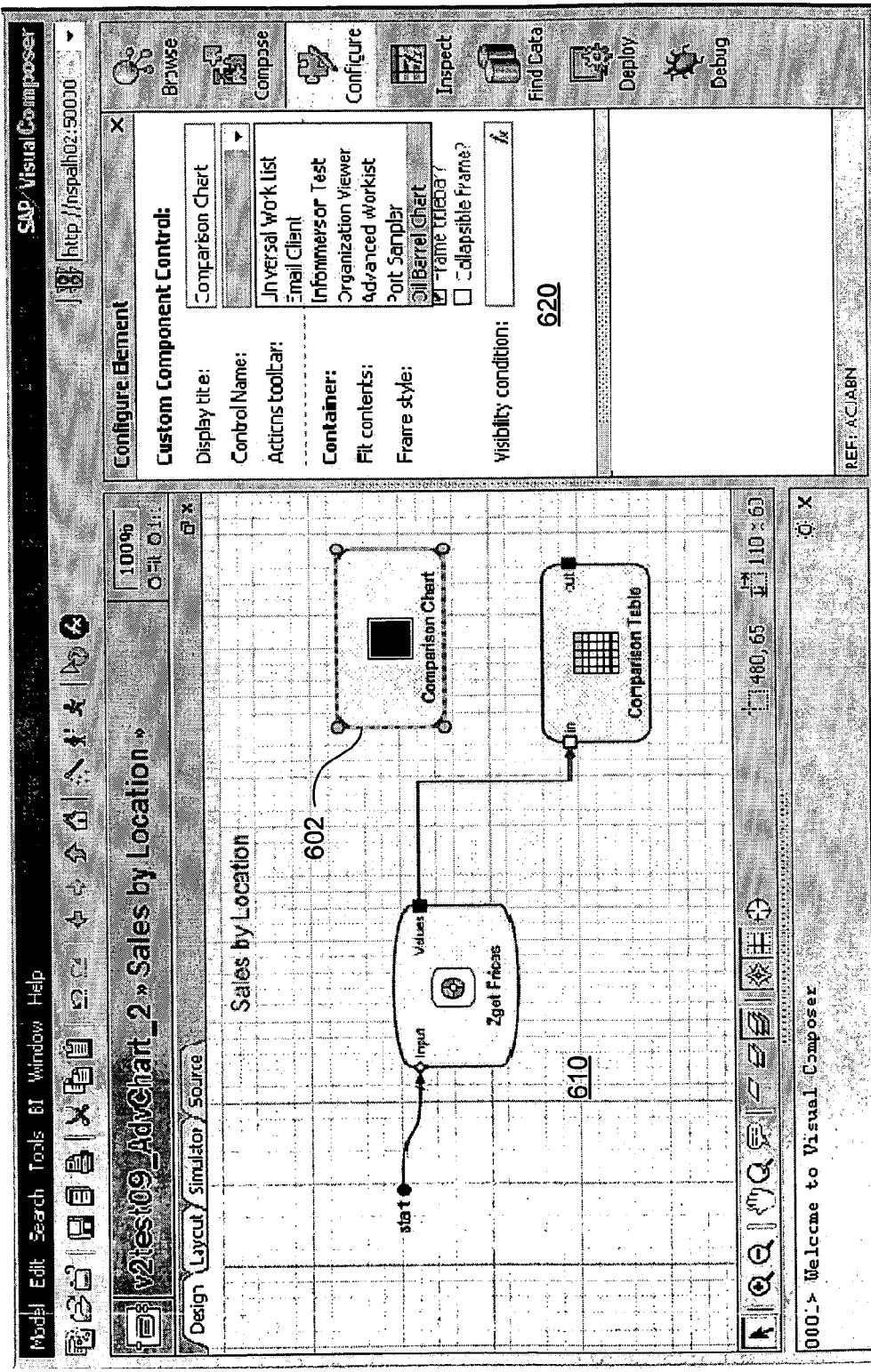

FIG. 6B shows a custom component that has been brought onto the storyboard. At design-time an additional custom component available in a custom component repository and registered by the component administrator, for example, may be added to the design tool for viewing and for including in an application. When the custom component is selected, a custom component discovery pane 620 is displayed, listing all available custom components from the repository. Each component can be dragged onto the storyboard and used in the design tool environment for modeling. The end user only needs to know that additional components are available. The user may use a drop down menu in discovery pane 620 to associate a particular custom component with the visual object of the custom component displayed in the storyboard. In this example, a user has associated the custom component "Oil Barrel Chart" with the visual custom component object 602. The custom component discovery pane 620 may connect via HTTP to the custom component plug-in (see FIG. 3B) running on the design tool. The plug-in may provide the custom component's details including all metadata so that when a custom component is dragged to the storyboard all properties and ports can be created. Therefore, the custom component plug-in provides, among other things, a generic extension mechanism to the palette.

Figure 6C:
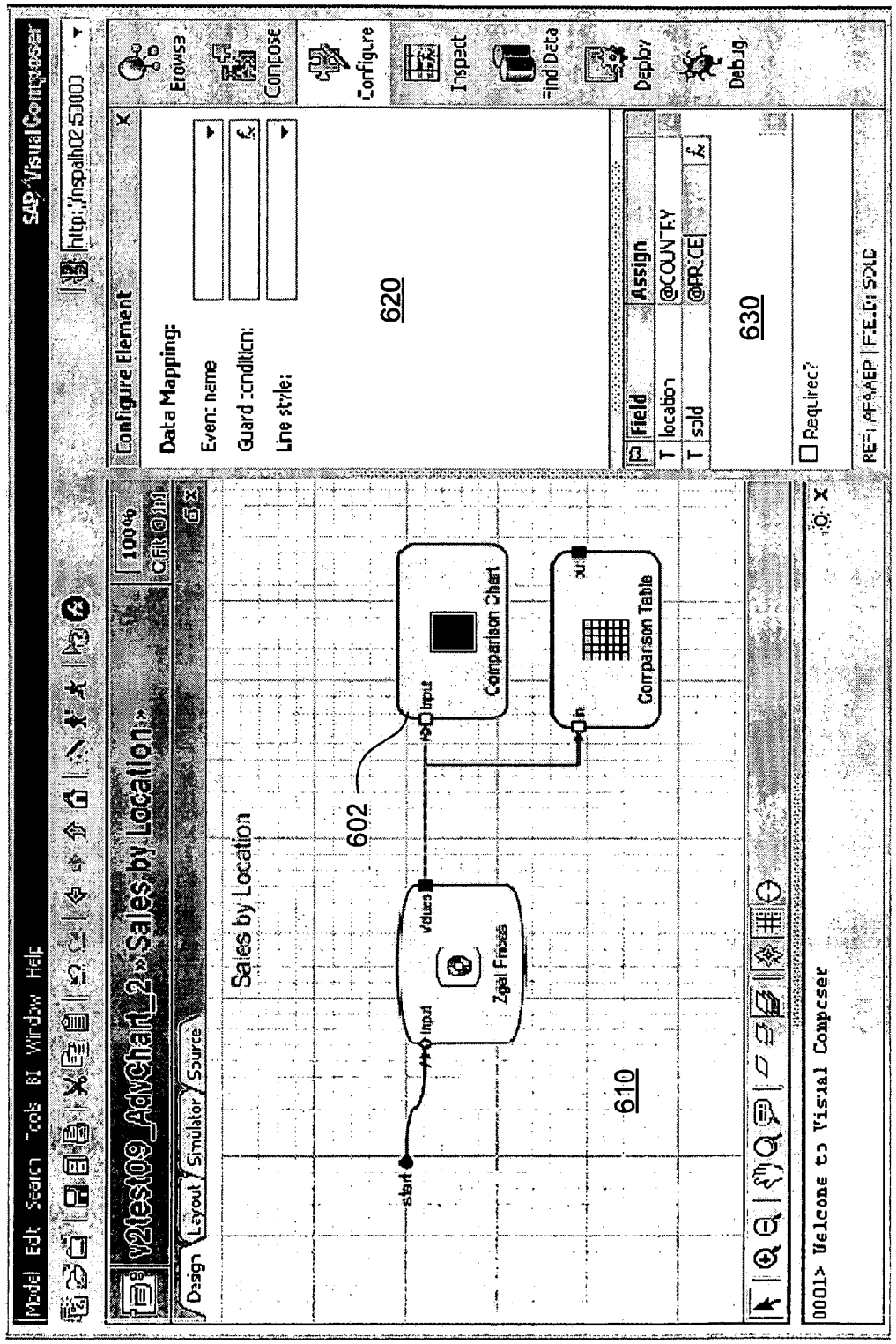
Figure 6D:
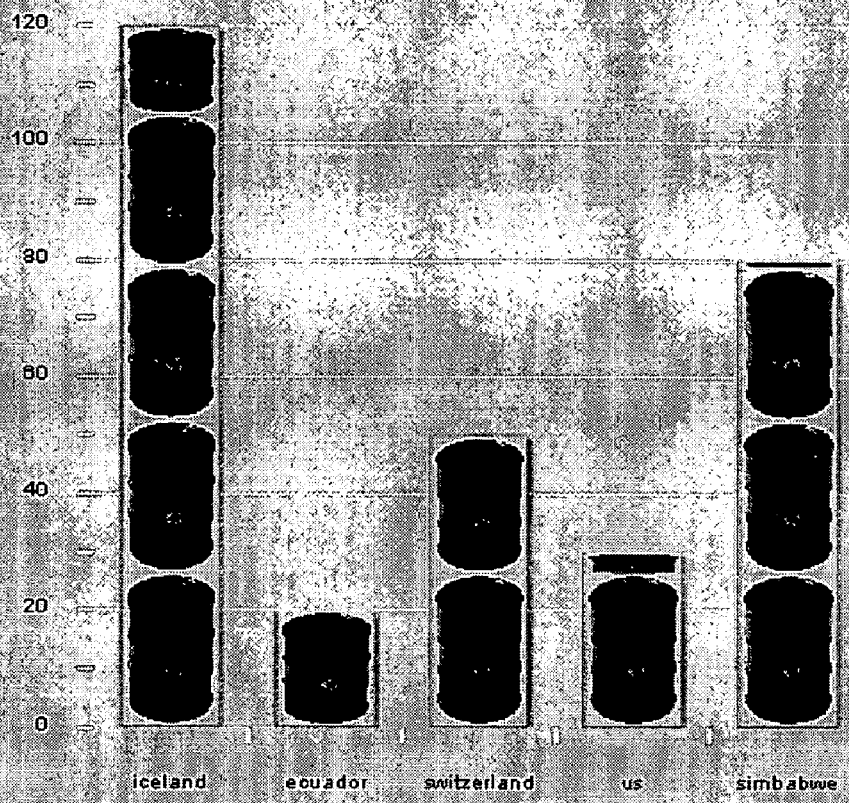

FIG. 6C shows a custom component 602 included in a model for an application. The model provides a graphical representation of dataflow, visualization, and events. As mentioned above, the coupling together of multiple components to form an application is also referred to as a mapping. A mapping may include the graphical representation of the components on the storyboard, and may further include the underlying information for coupling the components together (e.g., the storyboard metadata). Custom component 602 is included in a mapping for the application. For instance, the custom component has an input port coupled to the output port of the source component. In this example, custom component 602 is a custom display component for presenting data from the source in a particular style of display (e.g., as oil barrel), the functionality of which is provided by the custom component. The input port of the custom component may be mapped to particular attributes (i.e., "Fields") at the output of the source. An attribute is a changeable property or characteristic of a component (e.g., a custom component) that can be set to different values. For example, mapping pane 630 shows that the "location" attribute of the custom component input port is mapped to the "country" output of the source (i.e., @COUNTRY). Similarly, the "sold" attribute of the custom component input port is mapped to the "price" output of the source (i.e., @PRICE). Accordingly, the inputs to the custom component are defined, and these definitions may be used to generate executable code for passing the specified input data to the custom component at runtime for display. FIG. 6D shows the output of the custom component at run time. For each country, the price is display using oil barrels rather than a simple bar chart that may be available in the design tools native environment. By integrating the features of the custom component into the application, the designer is able to enhance the features and functions of the application. While the above example shows a custom component with only one input port, it is to be understood that other custom components may have input ports and output ports for receiving and sending a variety of attributes from and to one or more other components in the mapping.

Figure 7:
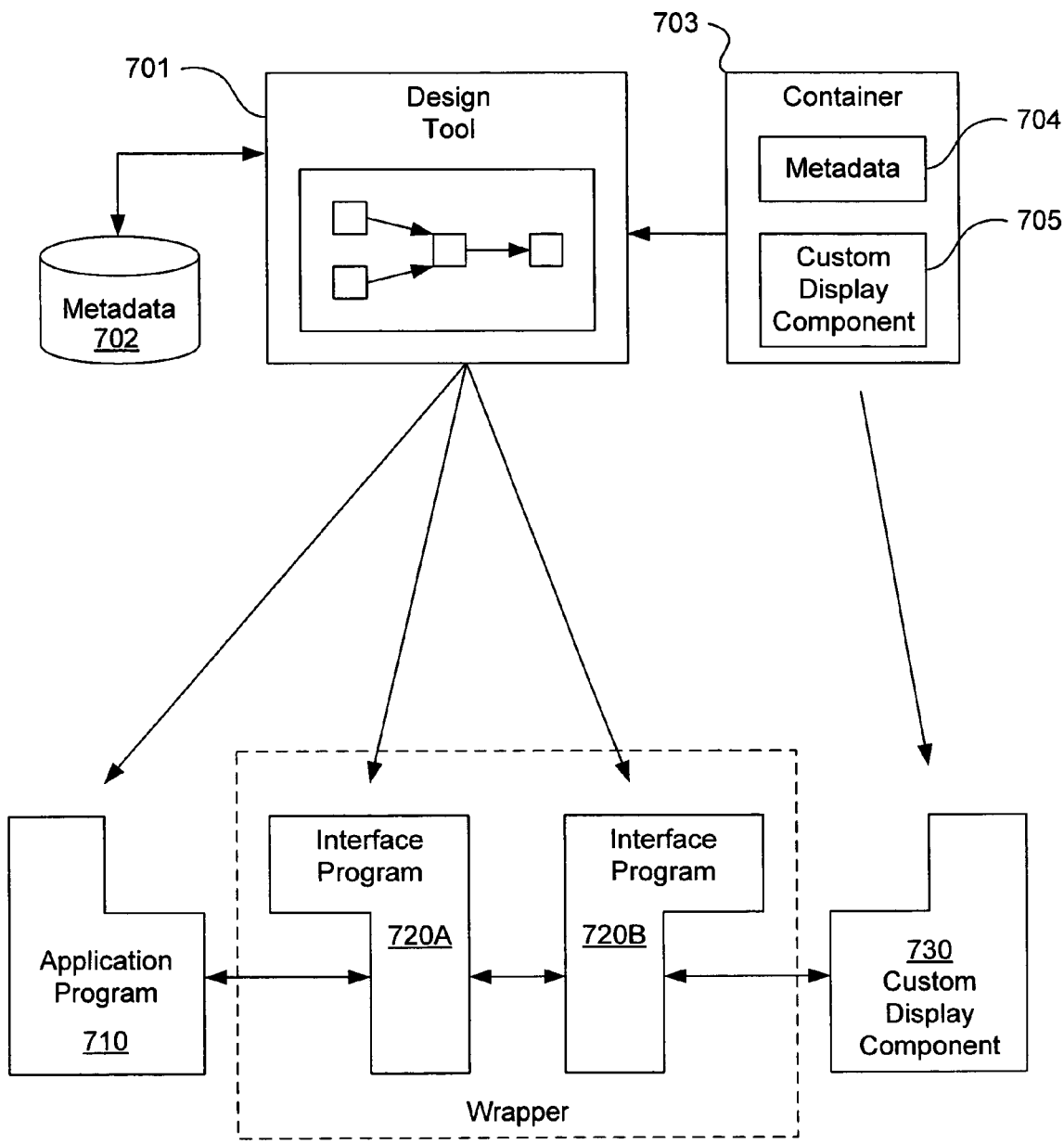
FIG. 7 illustrates an application integrated with a custom display component according to one embodiment of the present invention.
Figure 8:
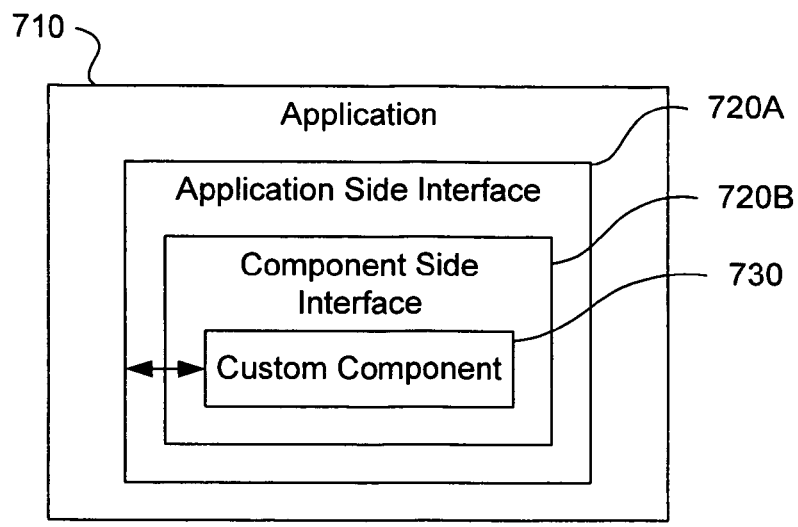
FIG. 8 illustrates the integration of an application and custom display component according to one embodiment of the present invention.

FIG. 7 illustrates integration of an application with a custom display component according to one embodiment of the present invention. A custom display component is a custom component that provides customized data display capabilities, such as the oil barrel display in the previous example. In this example, design tool 701 retrieves metadata 704 corresponding to custom display component 705, which may be stored together in a container 703. The metadata 704 may be converted into a local format by design tool 701 and stored in repository 702. A user may compose applications by mapping together visual objects corresponding to native or custom components. The mapping may also be stored as metadata. Thus, there may be two types of metadata: (i) metadata corresponding to the custom component that defines an interface for communicating with a custom component (e.g., see FIGS. 10B-C below) and (ii) mapping metadata which may include metadata about the custom component in a particular application (e.g., see FIG. 10D below). The design tool may then generate actual programming code from the mapping defined by associated metadata. The design tool may generate an application 710 and a wrapper based on the mapping and custom control metadata stored in repository 702. The wrapper may be used for interfacing between the custom component 730 and the application 710. In this example, the wrapper includes two interface programs 720A and 720B. The first interface program 720A communicates with application program 710, and the second interface program communicates with custom component 730. As shown in FIG. 8, the application side interface 720A and custom component side interface 720B "wrap" around the custom component to facilitate integration of the custom component 730 with application 710.

Figure 9:
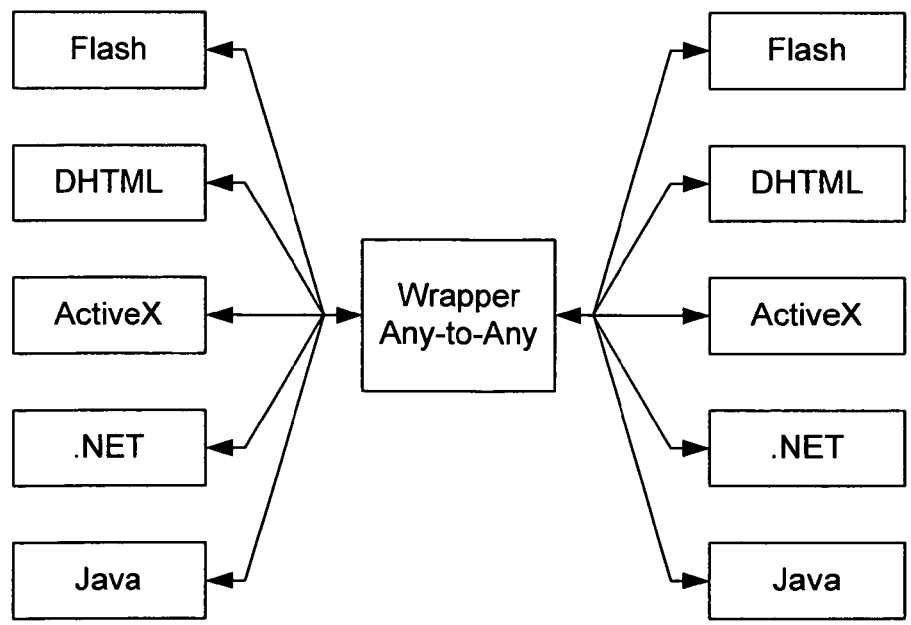
FIG. 9 illustrates using a wrapper to integrate applications and custom components in a variety of different technologies according to one embodiment of the present invention.

FIG. 9 illustrates using a wrapper to integrate applications and custom components in a variety of different technologies according to one embodiment of the present invention. A two-part wrapper may be used to create an "any-to-any" integration layer. For example, a user may configure the design tool to generate an application in any of a variety of technologies including Flash, DHTML, HTML, ActiveX, .NET, or Java., to name just a few possibilities. The custom component, on the other hand, may be in a different technology than the application is targeted for. Referring again to FIG. 7, a first interface program 720A may be automatically generated to communicate with an application generated by the design tool in Flash, for example, and a second interface program 720B may be automatically generated to communicate with a custom component in Java. Therefore, the communication function of the wrapper may include translating commands between different technologies. A two-part wrapper allows the application side interface to handle communications from the application, and the custom component side interface handles the communications to the custom control. Accordingly, an application may be implemented in any technology and still be able to communicate with custom controls implemented in a different technology. While the above example illustrates custom components that are implemented using user interface technologies that work with a browser, it is to be understood that the invention is not limited to UI technologies that are displayed in the browser.

Figure 10A:
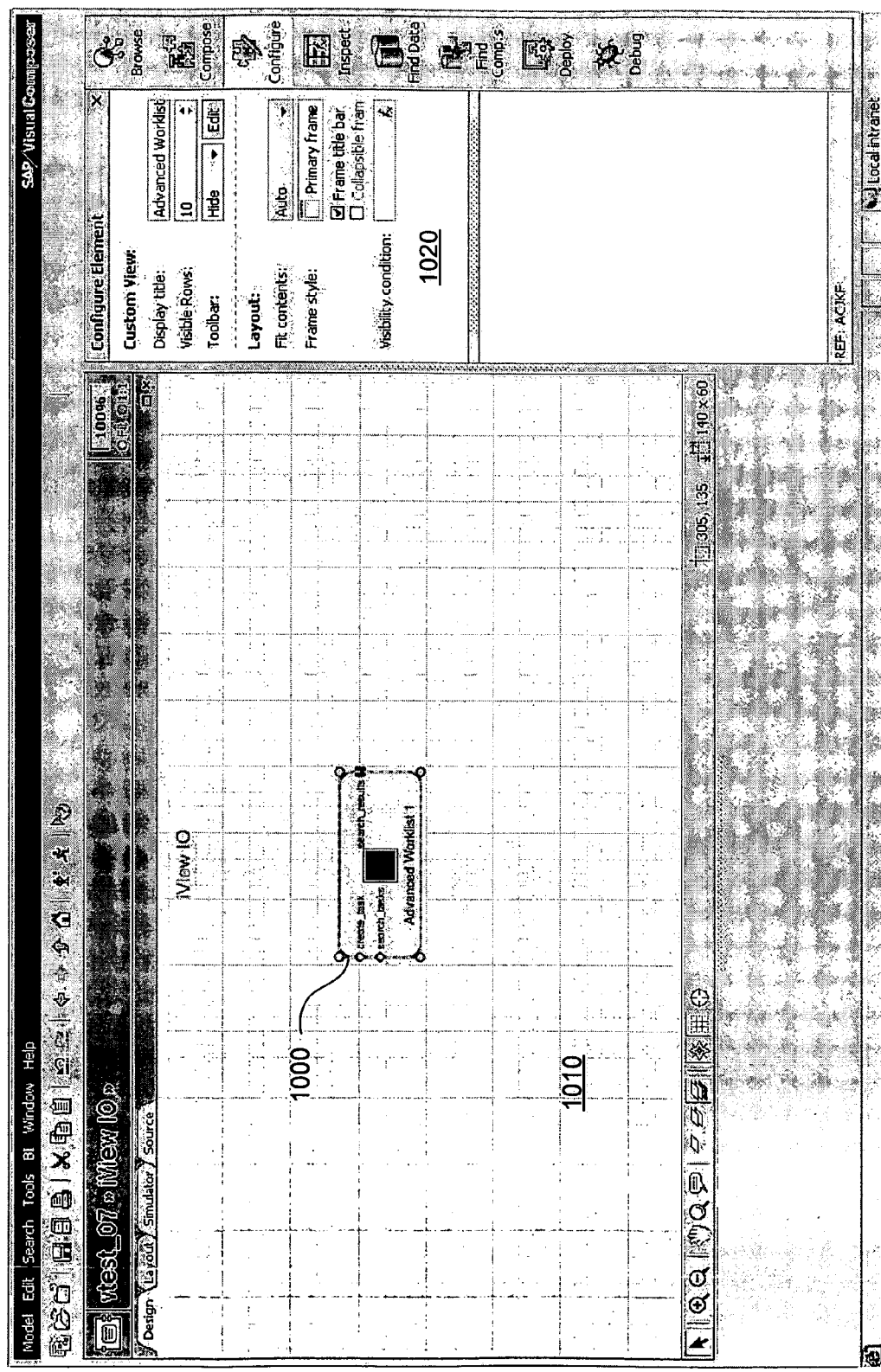

FIG. 10A illustrates a custom component incorporated into a design tool according to one embodiment of the present invention. Custom component 1000 has been incorporated into the design tool and dragged onto storyboard 1010. Discovery pane 1020 illustrates the properties of the custom component, such as the title of the component, "Advanced Worklist," and other properties such as the number of rows that may be viewed, for example. The custom component in this example has two input ports and one output port. The first input port, "create task," has three fields: a due date, subject, and priority. The second input port, "search tasks," has one field: a search term. The output port, "search results," has five fields: due, from, priority, sent, and subject. FIGS. 10B-C show an example of the metadata corresponding to custom component 1000, which may be stored in a container with the custom component in an XML file using the schema described in FIG. 5. FIG. 10D shows an example of the metadata after it has been retrieved and stored in the design tools native format.

FIG. 10E shows an example of a custom component side interface 720B of FIG. 7 for custom component 1000. This example wrapper is automatically generated by a design tool to support communications with a Flash based custom component. The "SetVariable" line in code 1060 is a Flash call to a method in the custom component. Code 1060, therefore, may be used to communicate information to the Flash custom component. On the other hand, code 1050 and 1051 is the output handler used to communicate information from the custom component to the application side interface of the wrapper. First, VBScript is used to call outside the Flash custom component. The VBScript includes a JavaScript function call ("comp_9_DoFSCommand") that invokes code 1051, which is a JavaScript call back to the application side interface of the wrapper. It is to be understood that different technologies for the application and custom component will result in different commands in different languages being used within the wrapper, and that the present invention is not limited to any particular language.

Figure 11:
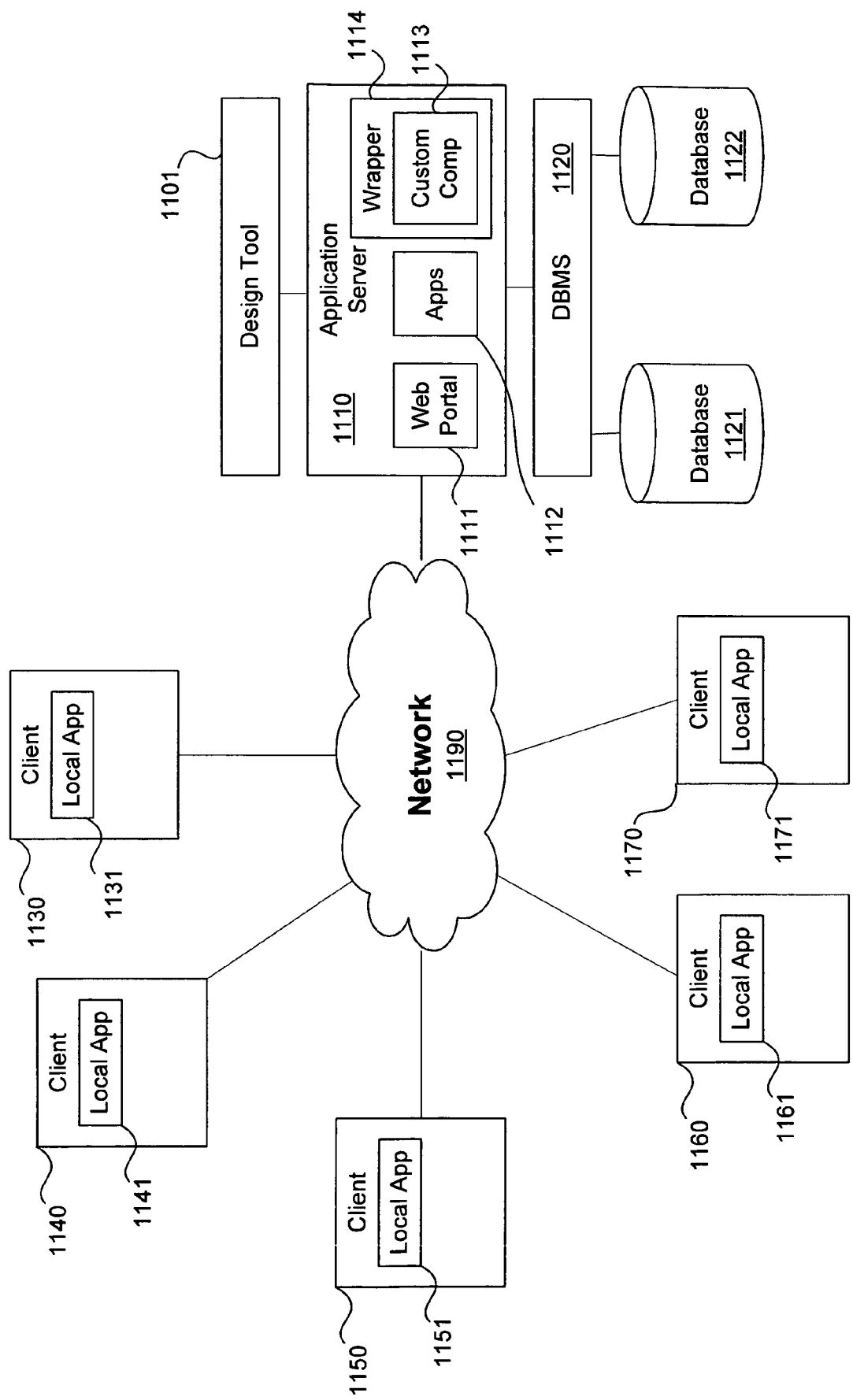
FIG. 11 illustrates an application and custom component deployed in a computer system according to one embodiment of the present invention.

FIG. 11 illustrates an application and custom component deployed in a computer system according to one embodiment of the present invention. First, a wrapper 1114 for the custom component 1113 is created by design tool 1101. The wrapper and custom component may be copied to a server 1110 for reference at run-time (e.g., in the server's web directory). The server may further include a web portal 1111 for controlling the execution of applications on the server by remote users. Applications 1112 or custom components 1113 may access a variety of resources including data from databases 1121-1122 through database management system 1120. In one embodiment, the application 1112 is deployed to server 1110 (e.g., a production server), and the client computers 1130-1170 may reference application 1112 from the server. In another embodiment, it is possible to deploy local applications 1131-1171 to clients 1130-1170. In either case, application 1112 on server 1110 or local applications 1131-1171 on clients 1130-1170 may communicate with custom component 1113 using wrapper 1114, for example. Applications generated by design tool 1101 integrate seamlessly with the custom component at run time with the help of the generated wrapper. The wrapper handles the two-way communication between applications and the custom component by acting as an adapter for a given technology (e.g., a UI technology) of the custom component. This allows a custom component written in DHTML to talk with the application written in Flash, for example, without the custom component having to write Flash specific communication code.

Figure 12:
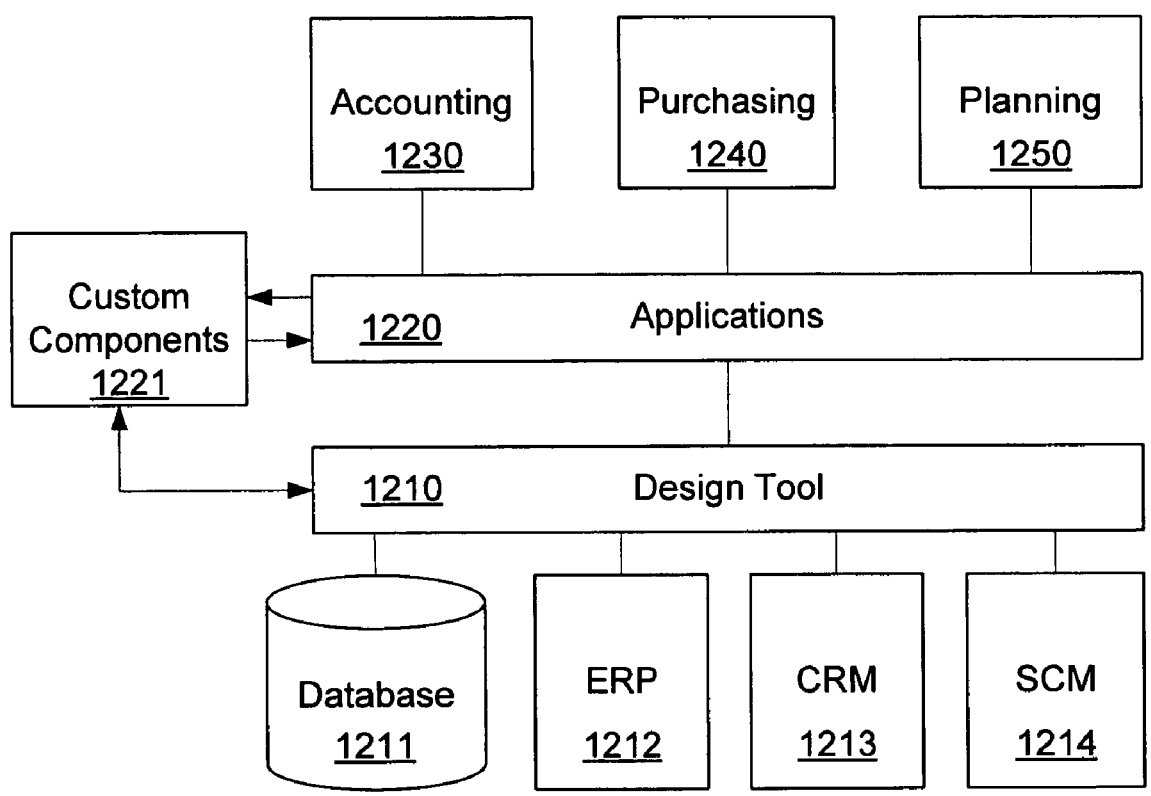
FIG. 12 illustrates a design tool and custom components integrated into an enterprise software system according to one embodiment of the present invention.

FIG. 12 illustrates a design tool and custom components integrated into an enterprise software system according to one embodiment of the present invention. A design tool 1210 may be used to generate applications that draw on resources available from a variety of available systems such as, for example, databases 1211, enterprise resource planning (ERP) systems 1212, customer relationship management (CRM) systems 1213, supply chain management (SCM) systems 1214, or any other application. Custom components 1221 may be integrated into design tool 1210 to generate applications 1220 with even more functionality. Example applications may include accounting applications 1230, purchasing applications 1240, or planning applications 1250 to name just a few.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A computer-implemented method comprising:
    in a design tool that supports model driven application development, creating an application comprising a plurality of native components, wherein the native components correspond to code for performing one or more functions, and wherein the native components correspond to visual objects in a graphical user interface associated with the design tool;
    receiving metadata that defines an interface for communicating with a custom component, wherein the custom component has corresponding code, wherein the custom component is a non-native component designed independently of, and in a different technology than, the native components in the application, and wherein the metadata specifies a technology for the custom component, one or more communication ports for the custom component, and one or more properties for the custom component;
    displaying a visual object corresponding to the custom component in the graphical user interface;
    mapping the visual object corresponding to the custom component to at least one other visual object corresponding to at least one of the plurality of native components, wherein at least one connector representing the mapping is displayed in the graphical user interface; and
    generating executable application code and wrapper code based on the metadata and the mapping, wherein the wrapper code communicates information between the custom component and the application, and wherein the wrapper code comprises a first component for communicating with the custom component and a second component for communicating with the application.

2. The method of claim 1 wherein the custom component is a custom display component.

3. The method of claim 1 wherein the mapping includes at least one attribute.

4. The method of claim 1 wherein the metadata is stored in a computer file having a predefined schema.

5. The method of claim 1 wherein the metadata is stored in an XML file.

6. The method of claim 1 wherein the custom component is in a first programming language and the application is in a second programming language.

7. The method of claim 1 wherein the wrapper converts commands between technologies.

8. A computer-readable medium containing instructions for controlling a computer system to perform a method, the method comprising:
    in a design tool that supports model driven application development, creating an application comprising a plurality of native components, wherein the native components correspond to code for performing one or more functions, and wherein the native components correspond to visual objects in a graphical user interface associated with the design tool;
    receiving metadata that defines an interface for communicating with a custom component, wherein the custom component has corresponding code, wherein the custom component is a non-native component designed independently of, and in a different technology than, the native components in the application, and wherein the metadata specifies a technology for the custom component, one or more communication ports for the custom component, and one or more properties for the custom component;
    displaying a visual object corresponding to the custom component in the graphical user interface;
    mapping the visual object corresponding to the custom component to at least one other visual object corresponding to at least one of the plurality of native components, wherein at least one connector representing the mapping is displayed in the graphical user interface; and generating executable application code and wrapper code based on the metadata and the mapping, wherein the wrapper code communicates information between the custom component and the application,
wherein the wrapper code comprises a first component for communicating with the custom component and a second component for communicating with the application.

9. The computer-readable medium of claim 8 wherein the custom component is a custom display component.

10. The computer-readable medium of claim 8 wherein the metadata is stored in a computer file having a predefined schema.

11. The computer-readable medium of claim 8 wherein the first visual object includes at least one of an input port or output port.

12. The computer-readable medium of claim 11 wherein a port includes one or more attributes and a user specifies attributes transferred between visual object ports in the mapping.

13. The computer-readable medium of claim 8 wherein the mapping is stored as metadata in a repository, and the design tool generates the application and the wrapper using the mapping metadata and metadata that defines the custom component.

14. A computer system comprising:
- an application coupled to one or more client computers over a network;
- a custom component;
- a metadata file having a predefined schema, wherein the metadata file includes information for communicating with the custom component; and
- a design tool that supports model driven application development for,
  - creating the application comprising a plurality of native components, wherein the native components correspond to code for performing one or more functions, and wherein the native components correspond to visual objects in a graphical user interface associated with the design tool;
  - receiving metadata that defines an interface for communicating with a custom component, wherein the custom component has corresponding code, wherein the custom component is a non-native component designed independently of, and in a different technology than, the native components in the application, and wherein the metadata specifies a technology for the custom component, one or more communication ports for the custom component, and one or more properties for the custom component;
  - displaying a visual object corresponding to the custom component in the graphical user interface;
  - mapping the visual object corresponding to the custom component to at least one other visual object corresponding to at least one of the plurality of native components, to define an application wherein at least one connector representing the mapping is displayed in the graphical user interface; and
  - generating executable application code and wrapper code based on the metadata and the mapping, wherein the wrapper code communicates information between the custom component and the application, wherein the wrapper code comprises a first component for communicating with the custom component and a second component for communicating with the application,
  wherein the custom component is stored on a server, and an application communicates with the custom component through the wrapper.

15. The system of claim 14 wherein the application and the wrapper are stored on the server.

16. The system of claim 14 wherein the application and at least a part of the wrapper is stored on a client computer.

17. The system of claim 14 wherein the application accesses resources in at least one database system, an ERP system, a CRM system, or a SCM system.

18. The system of claim 14 wherein the custom component is a custom display component.

* * * * *